United States Patent
Flynn et al.

(10) Patent No.: US 7,120,537 B2
(45) Date of Patent: Oct. 10, 2006

(54) SYSTEM AND METHOD FOR CHARACTERIZING TRAFFIC BEHAVIOR AT AN AIRPORT

(75) Inventors: Lorraine Flynn, Newton, MA (US); Mary Flynn, Newton, MA (US); James Steinberg, Melrose, MA (US)

(73) Assignee: RLM Software, Inc., Boston, MA (US)

( * ) Notice: Subject to any disclaimer, the term of this patent is extended or adjusted under 35 U.S.C. 154(b) by 177 days.

(21) Appl. No.: 10/976,195

(22) Filed: Oct. 27, 2004

(65) Prior Publication Data

US 2005/0085992 A1 Apr. 21, 2005

Related U.S. Application Data (63) Continuation of application No. 10/422,157, filed on Apr. 24, 2003, which is a continuation of application No. 10/027,771, filed on Dec. 20, 2001, now Pat. No. 6,580,998, which is a continuation-in-part of application No. 09/636,367, filed on Aug. 11, 2000, now Pat. No. 6,393,359.

(60) Provisional application No. 60/514,718, filed on Oct. 27, 2003, provisional application No. 60/299,149, filed on Jun. 18, 2001, provisional application No. 60/257,497, filed on Dec. 21, 2000, provisional application No. 60/195,776, filed on Apr. 10, 2000, provisional application No. 60/171,778, filed on Dec. 22, 1999.

(51) Int. Cl.
*G06G 7/76* (2006.01)
(52) U.S. Cl. .................. 701/120; 701/204
(58) Field of Classification Search ........ 701/120–122, 701/117, 3, 204; 342/63, 33, 29; 340/951, 340/958

See application file for complete search history.

(56) References Cited

U.S. PATENT DOCUMENTS

| | | | |
|---|---|---|---|
| 4,774,670 A | 9/1988 | Palmieri | 364/446 |
| 4,899,157 A | 2/1990 | Sanford et al. | 342/40 |
| 5,051,910 A | 9/1991 | Liden | 364/446 |
| 5,265,023 A | 11/1993 | Sokkappa | 364/439 |
| 5,448,243 A | 9/1995 | Bethke et al. | 342/59 |
| 6,049,754 A | 4/2000 | Beaton et al. | 701/204 |
| 6,393,359 B1 * | 5/2002 | Flynn et al. | 701/120 |
| 6,580,998 B1 * | 6/2003 | Flynn et al. | 701/120 |

FOREIGN PATENT DOCUMENTS

| | | |
|---|---|---|
| GB | 2327517 | 1/1999 |
| JP | 09205378 | 5/1997 |

OTHER PUBLICATIONS

Haerne, et al., "Airline Performance Modelling to Support Schedule Development: An Application Case Study", *Proceedings of the 1988 Winter Simulations Conference*, XP010304619, pp. 800-806.

(Continued)

*Primary Examiner*—Yonel Beaulieu
(74) *Attorney, Agent, or Firm*—Bromberg & Sunstein LLP (57) ABSTRACT

A method is provided for characterizing traffic behavior at an airport. Scheduled and real-time flight information for the airport is obtained and used to determine, over a selected interval of time, flight delay information. The flight delay information is used to characterize an extent of delay for the airport. Various embodiments characterize traffic behavior at a plurality of distinct airports and traffic behavior of a selected airline, both at an airport and at distinct airports.

67 Claims, 3 Drawing Sheets

OTHER PUBLICATIONS

Wieland, F., "Parallel Simulation for Aviation Applications", *Simulation Conference Proceedings*, 1988, Winter, Washington, D.C., USA Dec. 13-16, 1998, *IEEE* US pp. 1191-1198, XP010319562.

Press Release: WSI Launches Flight Watch, Jun. 26, 2001, pp. 1-3.
Patent Abstract of Japan, "Traffic Information Terminal Equipment and Traffic Information Processing Method", Korea Mobil Telecommun. Corp., 1997.

* cited by examiner

SYSTEM AND METHOD FOR CHARACTERIZING TRAFFIC BEHAVIOR AT AN AIRPORT

CROSS REFERENCE TO RELATED APPLICATIONS

The present application is a continuation-in-part of application Ser. No. 10/422,157, filed on Apr. 24, 2003, which was a continuation of application Ser. No. 10/027,771, filed on Dec. 20, 2001 and issued as U.S. Pat. No. 6,580,998 on Jun. 17, 2003, which was a continuation-in-part of application Ser. No. 09/636,367, filed on Aug. 11, 2000 and issued as U.S. Pat. No. 6,393,359 on May 21, 2002. Application Ser. No. 10/027,771 also claimed priority from provisional application Ser. No. 60/257,497, filed on Dec. 21, 2000, and on provisional application Ser. No. 60/299,149, filed on Jun. 18, 2001. Application Ser. No. 09/636,367 claimed priority from provisional application Ser. No. 60/171,778, filed on Dec. 22, 1999, and from provisional application Ser. No. 60/195,776, filed on Apr. 10, 2000. The present application also claims priority from provisional application Ser. No. 60/514,718, filed Oct. 27, 2003. All of the foregoing applications, which are for inventions by the present inventors, are hereby incorporated herein by reference in their entireties.

TECHNICAL FIELD

The present invention relates to a system and method for characterizing traffic behavior at an airport.

BACKGROUND

It is known in the prior art to utilize real-time flight data to estimate the landing time of aircraft that is in flight.

SUMMARY OF THE INVENTION

In a first embodiment of the invention there is provided a method of characterizing traffic behavior at an airport. In this embodiment, the method includes:

obtaining scheduled flight information for the airport;

obtaining real-time flight information for the airport;

determining, in a digital computer system, over a selected interval of time, flight delay information based on the scheduled flight information and the real-time flight information; and using the flight delay information to characterize an extent of delay for the airport.

In a further related embodiment, there is provided a method of characterizing traffic behavior of a selected airline at the airport. In this embodiment, determining flight delay information includes doing so for the selected airline and using the flight delay information to characterize an extent of delay includes doing so for the selected airline.

The method optionally includes making the extent of delay for the airport, thus characterized, available to a user over a network. The network may be the internet, a telephone network, a special case of the latter being a wireless telephone network.

In a further related embodiment, the scheduled and real-time flight information includes departure information, and the extent of delay characterized includes delay in departure. In another related embodiment, the scheduled and real-time flight information includes arrival information, and the extent of delay characterized includes delay in arrival. In yet another embodiment, the scheduled flight information includes scheduled arrival information and scheduled departure information and real-time flight information includes real-time arrival information and real-time departure information and the extent of delay characterized is based on delay in departure and delay in arrival.

A further related embodiment optionally includes repetitively determining, over successive selected intervals of time, flight delay information based on the scheduled flight information and the real-time flight information; and using the flight delay information to characterize an extent of delay for the airport averaged over the successive selected intervals. The successive selected intervals may be daily groupings that are repeated over a selected number of days. Optionally, the daily contiguous groupings are of intervals in which the airport experiences peak demand.

In another related embodiment, there also includes repeating the processes described above for a plurality of distinct airports; and displaying in a single view the characterizations of the extent of delay for the plurality of airports. The single view may optionally be a graphical view showing the plurality of airports on a map. Optionally, the view and details of the extent of delay are made available via a downloadable web page.

In another related embodiment, there also includes repetitively determining, over successive selected intervals of time, flight delay information based on the scheduled flight information and the real-time flight information; and determining a trend, over the successive selected intervals, with respect to the extent of delay.

The above embodiments may optionally include making available to the user at least one of the following items of information: (i) a list of any flights deemed delayed according to a set of criteria, and, (ii) for at least one of such flights, a characterization of the extent of its delay (optionally its actual delay), its flight number and airline identifier, and optionally its aircraft type, or actual, scheduled or estimated departure time, (iii) its destination airport and estimated time of arrival, (iv) other flight information pertinent thereto including arrival or departure gate and (v) identification of a next segment, if any, to be followed by aircraft for the at least one of such flights, such segment's destination airport and other information as described in (ii), (iii), and (iv). Optionally this information may be made available to the user by providing a suitable hyperlink on a web page to access the information. The extent of delay may be determined on the basis of flights that have actually departed, estimates of delay for flights that have not departed, flights that have actually arrived, or estimates of delay for flights that have not yet arrived Any of the information discussed above may be made airline specific. So, as an example, in another embodiment, the invention provides a method of characterizing traffic behavior of an airline, and in this embodiment, the method includes:

obtaining scheduled flight information for the airline;

obtaining real-time flight information for the airline;

determining, in a digital computer system, over a selected interval of time, flight delay information based on the scheduled flight information and the real-time flight information; and using the flight delay information to characterize an extent of delay for the airline with respect to the selected interval.

A computer program product implementing the foregoing methods is also provided.

BRIEF DESCRIPTION OF THE DRAWINGS

The foregoing features of the invention will be more readily understood by reference to the following detailed description, taken with reference to the accompanying drawings, in which.

DETAILED DESCRIPTION OF SPECIFIC EMBODIMENTS

Pertinent to the disclosure herein is U.S. Pat. No. 6,580,998, for a system and method for estimating aircraft flight delay, by the inventors herein; this related patent is hereby incorporated herein by reference.

Figure 1:
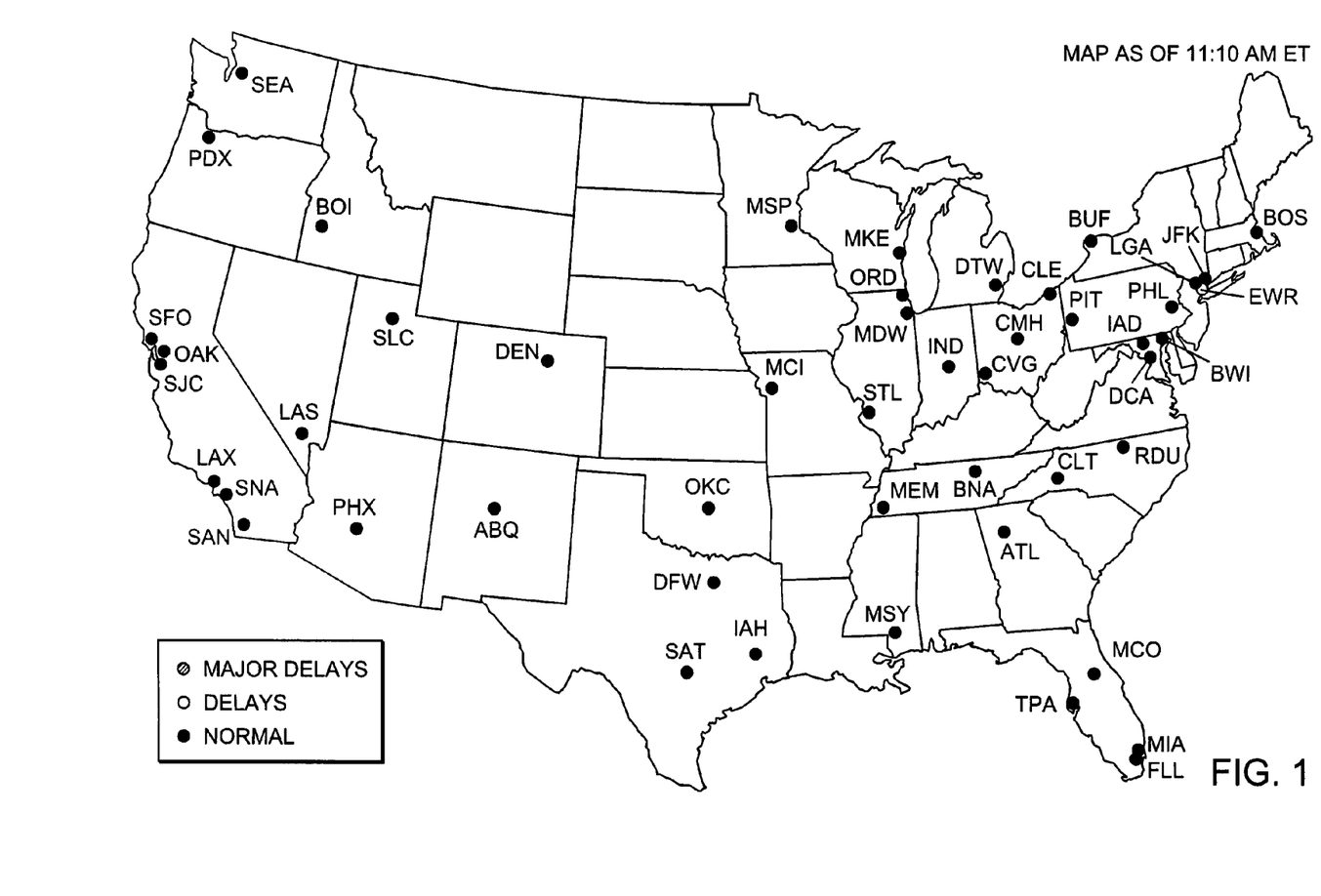
FIG. 1 is a representation, in accordance with an embodiment of the present invention, of a graphical display in the form of a map on which are shown airport locations with respect to which is present a delay characterization of the air traffic at such airport.

FIG. 1 is a representation, in accordance with an embodiment of the present invention, of a graphical display in the form of a map on which are shown airport locations with respect to which is present a delay characterization of the air traffic at such airport. The dot representing each airport is colored differently depending on whether there are conditions that are normal (i.e., substantially no delays outside normal limits) (dot is green), with delays (dot is yellow), or with major delays (dot is red).

In a further embodiment, the graphical display is presented to a user as a web page, and each airport dot is a potential hyperlink. In case delays are present at the airport in question, the user invokes the hyperlink and is provided with a web page having a format and content similar to that of Table 1 below, showing detail underlying the delay. (Here we assume the delay is a Boston's Logan airport.) The information provided to the user under these circumstances may include at least one of the following items of information: (i) a list of any flights deemed delayed according to a set of criteria, and, (ii) for at least one of such flights, a characterization of the extent of its delay (optionally its actual delay), its flight number and airline identifier, and optionally its aircraft type, or actual, scheduled or estimated departure time, (iii) its destination airport and estimated time of arrival, (iv) other flight information pertinent thereto including arrival or departure gate and (v) identification of a next segment, if any, to be followed by aircraft for the at least one of such flights, such segment's destination airport and other information as described in (ii), (iii), and (iv). In this particular example, (in order of the headings moving from left to right) we show the flight number, the departure airport, the scheduled departure, the actual departure, the delay, the destination airport, the scheduled arrival at the destination airport, and the estimated arrival at the destination airport.

Figure 2:
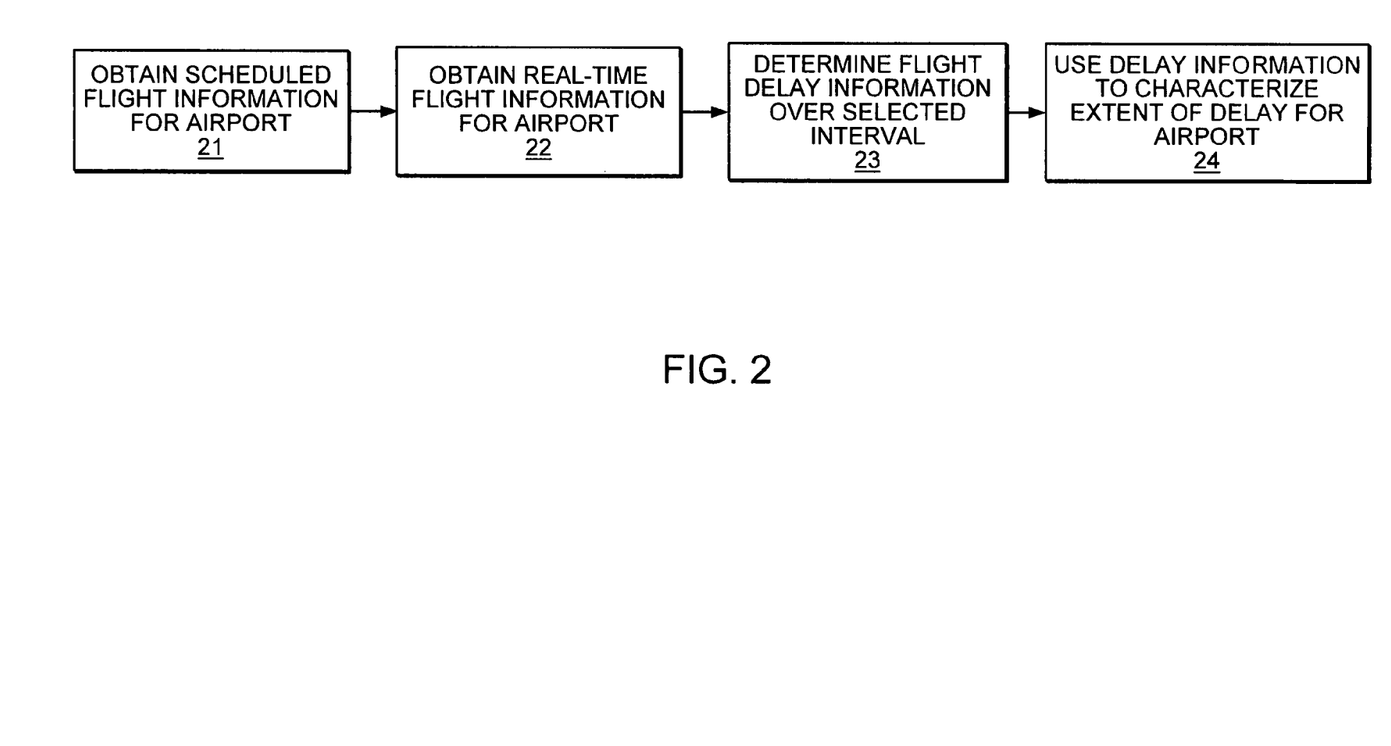
FIG. 2 is a block diagram of an embodiment of a method in accordance with the present invention.

FIG. 2 is a block diagram of an embodiment of a method in accordance with the present invention. In this method, there is obtained in process 21 scheduled flight information for the airport. In process 22, there is obtained real-time flight information for the airport (typically, in the United States, from FAA real-time data). In process 23, there is determined, over a selected interval of time (such as one, two, to three hours, for example) flight delay information based on the scheduled flight information and the real-time flight information. In process 24, the flight delay information is used to characterize an extent of delay for the airport. It will be apparent that these processes may be implemented in a digital computer system, and embodiments of the invention include a digital computer system programmed to implement the foregoing processes.

There are a variety of methods by which airport traffic delay may be determined. For example, delay in departure may be determined by examining actual departures over a selected interval, and for each actual departure determining the amount of any delay between the actual departure time and the scheduled departure time. An alternative to this approach would examine over the selected interval all scheduled departures and would use actual departure data when available (such data being available if the flight has actually departed) and would estimate delay for such flights that have not yet departed. Each method has benefits and disadvantages. The first method, while definitive with respect to delay of actually departed flights may underestimate delay, for example, if some scheduled flights have been so delayed as not yet to have departed. The second method may also underestimate delay, for example, if undeparted scheduled flights are delayed over successive intervals. A third method would combine both approaches by determining a first delay contribution with respect to flights actually departing during the interval and a second delay contribution with respect to undeparted flights scheduled to depart during the current interval and possibly previous intervals and the estimated delay is a weighted sum of these contributions.

Figure 3:
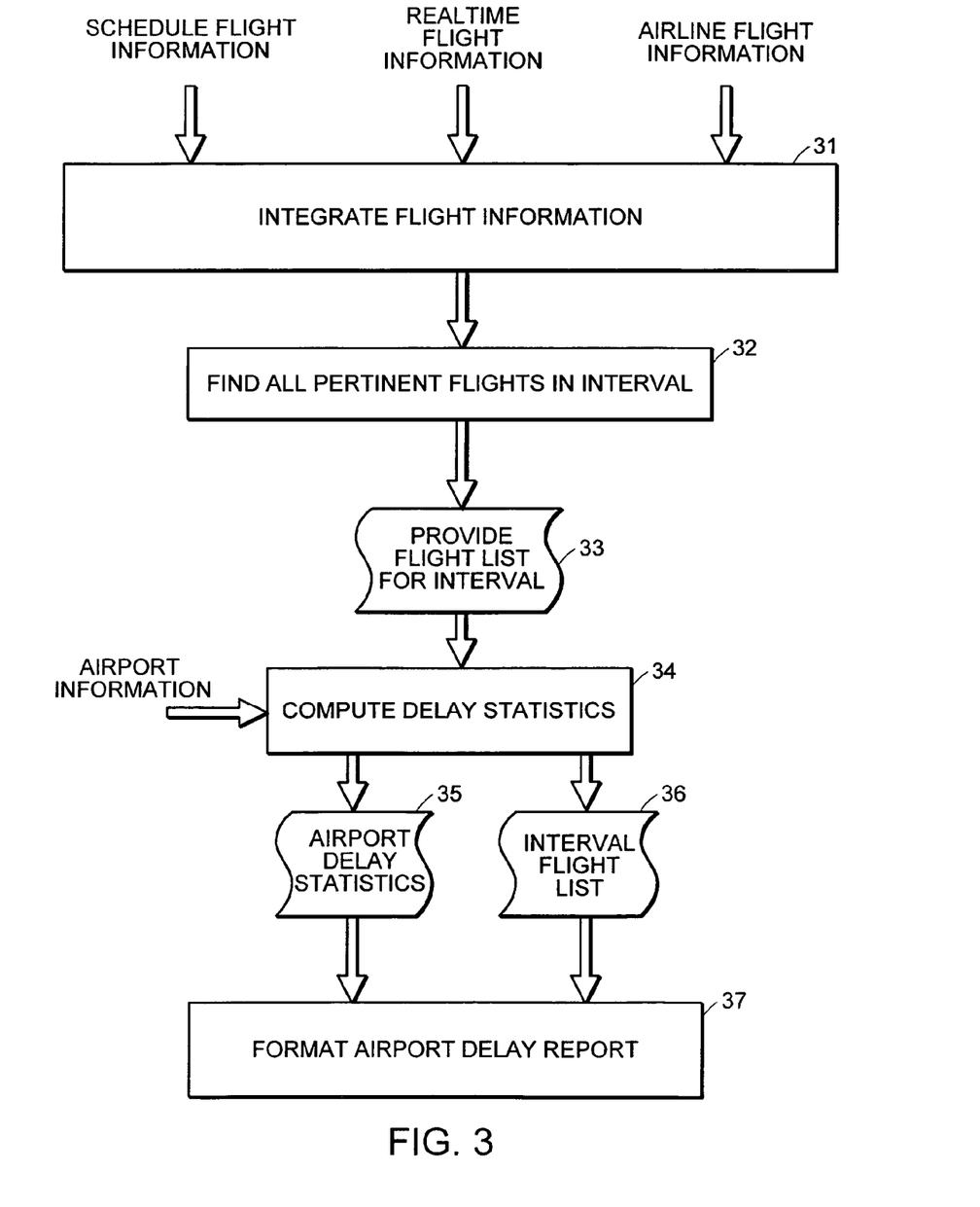
FIG. 3 is a more detailed block diagram of an implementation of the method of FIG. 2.

FIG. 3 is a more detailed block diagram of an implementation of the method of FIG. 2. In this figure, in process 31, flight information, including flight schedule information, real-time flight information, and, optionally, additional airline or flight information (such as gate information), is integrated in a database. In process 32, for a selected interval of time, there are found all flights that are pertinent to an airport of interest during the selected interval. As discussed in the previous paragraph, these flights may be (in accordance with the second method of delay determination) all flights scheduled to depart in the selected interval. (However, if the first method is used, the flights will be all flights actually departed in the selected interval, and if the third method is used, then both scheduled and departed flights in the interval will be necessary.) In process 33, there is provided the flight list data for the interval as described in process 32; this data includes data for each flight on the list, including departure and arrival information. In process 34, the information from processes 32 and 33 is used—optionally with airport information—to determine any delays associated with each scheduled flight pertinent to the interval. In process 35, there are derived, from the results of process 34, statistics characterizing the extent of delay at the airport. Also, in process 36, there is assembled, into a flight list for the interval, the data from processes 33 and 34. In process 37, the results of processes 35 and 36 are assembled into a report constituting delay information pertinent to the interval for the airport. The report may be furnished in a wide range of formats, including a map such as described above in connection with FIG. 1 and Table 1. A sample XML format report providing delay data is shown in Table 2.

The processes just described have been in the context of airport delay, but it will be apparent, that similar processes, limited to flights of a particular airline may be used in determining airline delay, either at a specific airport of interest or more generally with respect to a selected group of airports, including, for example, all airports serviced by the airline in the United States. In this respect process 32 of FIG.

3 can configured to provide any desired flight information for purposes of delay determination.

Although the present description has focused on the calculation of extent of delay based on departures (using actual departures or estimated future departures or both), it is also within the scope of embodiments herein to calculate extent of delay based on arrivals (either actual arrivals or estimated future arrivals or both). Similarly, extent of delay can be determined, directly or indirectly, by a function of both departure delay and arrival delay.

Below we provide, in outline form, an embodiment of the structure of software coding, using the second method for delay determination, for implementation of embodiments described above. Additional and alternative approaches for delay determination are disclosed in the applications incorporated herein by reference.

The described embodiments of the invention are intended to be merely exemplary and numerous variations and modifications will be apparent to those skilled in the art. All such variations and modifications are intended to be within the scope of the present invention as defined in the appended claims.

Outline of Software Coding for Processes for Delay Determination

Build and maintain database of integrated flight schedule information and real time flight information, and airline-provided flight information. Optionally, build and maintain a database of airport specific factors, such as taxi in and taxi out times.

At the beginning of each interval (say, once every 15 minutes)
   T1=Now−X (say, 15 minutes)
   T0=T1−Y (Y is the selected interval; say, two hours)
   For each airport:

From the above database, get list of flights (FlightList) departing (arriving) the airport whose scheduled departure (arrival) time is in the interval (T0−T1).

Each flight record in FlightList typically has at least the following information:
   Flight number
   Departure airport
   Arrival airport
   Scheduled departure time
   Scheduled arrival time
   Actual departure time
   Actual arrival time
   FlightDelay (computed in algorithm)
   I is an index into FlightList
   For each flight (I) in FlightList:
     If the flight has departed (arrived)
   Then FlightDelay[I]=
   CalculateDelay(Actual departure (arrival) time,Scheduled departure (arrival) time) (this is subtraction)
   Else   FlightDelay[I]=CalculateDelay(T1,Scheduled departure (arrival) time) (use subtraction and add quantity to estimate additional delay of not yet departed flight)
   Increment index, I=I+1

Calculate Airport Delay Statistics
   From the above FlightDelay list:
   Calculate the mean of the flight delays
   Calculate the standard deviation of the flight delays
   Calculate the value of the Outlier delay (say mean+1.75*standard deviation)

Determine Delayed Flight List
   J=0
   K=0
   For each flight in the above FlightList, indexed by I:
   If FlightDelay[I]<X (say 15 minutes)
     Then OntimeFlight[J]=Flight[I] from the FlightList, increment J
     Else if FlightDelay[I]<Outlier delay
       Then LateFlight[K]]=Flight[I] from the FlightList, increment K
     Else do not use this flight's delay value (too extreme)

Recompute Airport Delay Statistics
   From the above LateFlight list:
   Calculate the mean of the flight delays
   Calculate the standard deviation of the flight delays Compute Histogram of Flight Delays
   For each flight in the above FlightList, indexed by I (Optionally may remove outliers by using only FlightDelay from flights in OntimeFlight and LateFlight Lists):
     K=FlightDelay[I]/BinInterval (say 15 (minutes))
     HistogramBin[K]=HistogramBin[K]+1
   Compute Delay Characteristic of Airport
   Green=HistogramBin[0]+HistogramBin[1], say
   Yellow=HistogramBin[2]+HistogramBin[3]]+HistogramBin[4]]+HistogramBin[5], say
   Red=HistogramBin[6]+HistogramBin[7] . . . , say
   Export this information (including on-time list, delayed flight list, histogram, and delay characteristic) for presentation, display.

TABLE 1

DEPARTURE DELAY REPORT
Boston Logan International Airport (BOS)
Oct. 24, 2003 - 15:18
14:00 to 15:00

| Flight | Airport | Scheduled | Actual | Delay | Airport | Scheduled | Estimated |
|---|---|---|---|---|---|---|---|
| AA1591 | BOS | 13:26 | 14:07 | 41 | DFW | 14:56 | 15:03 |
| AA2355 | BOS | 13:42 | 14:34 | 52 | STL | 15:10 | 15:56 |
| AA4806 | BOS | 14:11 | | 67 | JFK | 14:57 | |
| CO8648 | BOS | 13:14 | 14:02 | 46 | HPN | 14:00 | 14:36 |
| DL2523 | BOS | 14:22 | 14:53 | 31 | TPA | 16:58 | 17:22 |
| DL6189 | BOS | 14:23 | 14:25 | 0 | PHL | 15:32 | 15:30 |
| HP29 | BOS | 13:50 | 14:18 | 28 | PHX | 17:01 | 17:15 |
| UA193 | BOS | 14:36 | 14:42 | 0 | IAD | 15:45 | 15:51 |
| UA531 | BOS | 14:25 | 14:48 | 23 | ORD | 15:32 | 15:41 |
| US2029 | BOS | 14:15 | 14:48 | 33 | DCA | 15:30 | 15:47 |

TABLE 2

Sample XML feed of delays

- <AirportDelayResult>
 - <ProcessingStamp>
  - <DateTime>
   <Date>2003-10-22</Date>
   <Time>18:08:51</Time>
   <UTC />
  </DateTime>
 - <Server>
  <Host>lnk</Host>
  - <AirportDelayGenerator>
   <Name>AirportDelay.exe</Name>
   <Version>0.0.0.1</Version>
  </AirportDelayGenerator>
  </Server>
 </ProcessingStamp>
- <AirportDelay>

TABLE 2-continued

Sample XML feed of delays

```
- <Airport>
    - <AirportId>
        <AirportCode>ORD</AirportCode>
        <IATACode />
      </AirportId>
  </Airport>
- <Distribution>
    - <Grouping>
        <Name>On Time</Name>
        <MaxDelay>15</MaxDelay>
        <Count>105</Count>
      </Grouping>
    - <Grouping>
        <Name>Late</Name>
        <MinDelay>15</MinDelay>
        <MaxDelay>60</MaxDelay>
        <Count>29</Count>
      </Grouping>
    - <Grouping>
        <Name>Very Late</Name>
        <MinDelay>60</MinDelay>
        <Count>2</Count>
      </Grouping>
  </Distribution>
- <Details>
    <DelayKind>Departure Delays</DelayKind>
    <AverageDelay>10.67</AverageDelay>
    <AverageDelay excludeGrouping="On
        Time">23.15</AverageDelay>
    <DelayStandardDeviation excludeGrouping="On
        Time">5.55</DelayStandardDeviation>
  </Details>
</AirportDelay>
```

We claim:

1. A method of characterizing traffic behavior at an airport, the method comprising:
   obtaining scheduled flight information for the airport;
   obtaining real-time flight information for the airport;
   determining, over a selected interval of time, flight delay information based on the scheduled flight information and the real-time flight information; and
   using the flight delay information to characterize an extent of delay for the airport.

2. A method according to claim 1, of characterizing traffic behavior of a selected airline at the airport, wherein determining flight delay information includes doing so for the selected airline and using the flight delay information to characterize an extent of delay includes doing so for the selected airline.

3. A method according to claim 1, further comprising:
   making the extent of delay for the airport, thus characterized, available to a user over a network.

4. A method according to claim 3, wherein the network is the internet.

5. A method according to claim 3, wherein the network is a telephone network.

6. A method according to claim 5, wherein the network includes a wireless telephone network.

7. A method according to claim 1, wherein the scheduled and real-time flight information includes departure information, and the extent of delay characterized includes delay in departure.

8. A method according to claim 1, wherein the scheduled and real-time flight information includes arrival information, and the extent of delay characterized includes delay in arrival.

9. A method according to claim 1, wherein the scheduled flight information includes scheduled arrival information and scheduled departure information and the real-time flight information includes real-time arrival information and real-time departure information, and the extent of delay characterized is based on delay in departure and the delay in arrival.

10. A method according to claim 1, further comprising:
    repetitively determining, over successive selected intervals of time, flight delay information based on the scheduled flight information and the real-time flight information; and
    using the flight delay information to characterize an extent of delay for the airport averaged over the successive selected intervals.

11. A method according to claim 10, further including determining a trend, over successive selected intervals, with respect to the extent of delay.

12. A method according to claim 10, wherein the successive selected intervals are daily groupings that are repeated over a selected number of days.

13. A method according to claim 12, wherein the daily contiguous groupings are of intervals in which the airport experiences peak demand.

14. A method according to claim 1, further comprising:
    repeating the steps of obtaining scheduled flight information for the airport; obtaining real-time flight information for the airport; determining, over a selected interval of time, flight delay information based on the scheduled flight information and the real-time flight information; and using the flight delay information to characterize an extent of delay for the airport for a plurality of distinct airports; and
    making available for display in a single view the characterization of the extent of delay for each airport.

15. A method according to claim 14, wherein the single view is a graphical view showing the plurality of airports on a map.

16. A method according to claim 15, wherein the graphical view is made available via a downloadable web page.

17. A method according to claim 16, wherein details of the extent of delay is made available via the downloadable web page.

18. A method according to claim 17, wherein the details of the extent of delay include a list of flights delayed.

19. A method according to claim 18, wherein the list of flights delayed includes for each delayed flight at least one of a characterization of the extent of its delay, its flight number, its aircraft identifier, aircraft type, departure airport, actual departure time, scheduled departure time, estimated departure time, destination airport, estimated time of arrival.

20. A method according to claim 17, wherein the details of the extent of delay are made available by providing a suitable hyperlink on the web page to access the information.

21. A method according to claim 1, further including making available to a user at least one of:
    a list of any flights deemed delayed according to a set of criteria; and
    (ii) for at least one flight deemed delayed, at least one of
        (a) a characterization of the extent of its delay;
        (b) flight number; aircraft identifier; aircraft type;
        (c) departure airport; actual departure time, scheduled departure time, estimated departure time;
        (d) destination airport; estimated time of arrival;
        (e) arrival or departure gate; and (f) identification of a next segment, if any, to be followed by aircraft for the at least one of flights deemed delayed.

22. A method according to claim 21, wherein the extent of delay is determined, at least in part, on the basis of flights that have actually departed.

23. A method according to claim 21, wherein the extent of delay is determined, at least in part, on the basis of delay estimated for flights that have not yet departed.

24. A method according to claim 21, wherein the extent of delay is determined, at least in part, on the basis of flights that have actually arrived.

25. A method according to claim 21, wherein the extent of delay is determined, at least in part, on the basis of delay estimated for flights that have not yet arrived.

26. A method according to claim 21, further including making the information available to a user by providing a suitable hyperlink on a web page to access the information.

27. A method of characterizing traffic behavior of an airline, the method comprising:
   obtaining scheduled flight information for the airline;
   obtaining real-time flight information for the airline;
   determining, over a selected interval of time, flight delay information based on the scheduled flight information and the real-time flight information;
   using the flight delay information to characterize an extent of delay for the airline with respect to the selected interval.

28. A method according to claim 27, wherein the processes are performed with respect to a set of selected airports serviced by the airline.

29. A method according to claim 27, wherein scheduled flight information includes departure information and arrival information.

30. A method according to claim 27, wherein determining flight delay information includes determining average delay by averaging the difference between scheduled flight information and real-time flight information by time of day over a selected number of days.

31. A method according to claim 27, further including making available for display on a map a characterization of the extent of delay.

32. A method according to claim 31, further including making the map available via a downloadable web page.

33. A method according to claim 32, further including making the scheduled flight information, the real-time flight information, and the flight delay information available via a downloadable web page.

34. An apparatus for characterizing traffic behavior at an airport, the apparatus comprising:
   means for obtaining scheduled flight information for the airport;
   means for obtaining real-time flight information for the airport;
   means for determining, over a selected interval of time, flight delay information based on the scheduled flight information and the real-time flight information; and
   means for using the flight delay information to characterize an extent of delay for the airport.

35. A computer program product for use on a computer system for characterizing traffic behavior at an airport, the computer program product comprising a computer usable medium having computer readable program code thereon, which, when loaded into the computer system, establishes an apparatus comprising:
   inputs to the computer system specifying scheduled flight information for the airport and real-time flight information for the airport, wherein flight delay information based on the scheduled flight information and real-time flight information is determined over a selected interval and is used to characterize an extent of delay for the airport; and
   an output from the computer system responsive to the input.

36. A computer program product according to claim 35, wherein determining flight delay information includes doing so for the selected airline and using the flight delay information to characterize an extent of delay includes doing so for the selected airline.

37. A computer program product according to claim 35, wherein the apparatus further comprises:
   means for making the extent of delay for the airport, thus characterized, available to a user over a network.

38. A computer program product according to claim 37, wherein the network is the internet.

39. A computer program product according to claim 37, wherein the network is a telephone network.

40. A computer program product according to claim 39, wherein the network includes a wireless telephone network.

41. A computer program product according to claim 35, wherein the scheduled flight and real-time flight information includes departure information, and the extent of delay characterized includes delay in departure.

42. A computer program product according to claim 35, wherein the scheduled and real-time flight information includes arrival information, and the extent of delay characterized includes delay in arrival.

43. A computer program product according to claim 35, wherein the scheduled flight information includes scheduled arrival information and scheduled departure information and the real-time flight information includes real-time arrival information and real-time departure information, and the extent of delay characterized is based on delay in departure and the delay in arrival.

44. A computer program product according to claim 35, wherein the apparatus further comprises:
   means for repetitively determining, over successive selected intervals of time, flight delay information based on the scheduled flight information and the real-time flight information; and
   means for using the flight delay information to characterize an extent of delay for the airport averaged over the successive selected intervals.

45. A computer program product according to claim 44, wherein the apparatus further comprises:
   means for determining a trend, over successive selected intervals, with respect to the extent of delay.

46. A computer program product according to claim 44, wherein the successive selected intervals are daily groupings that are repeated over a selected number of days.

47. A computer program product according to claim 46, wherein the daily contiguous groupings are of intervals in which the airport experiences peak demand.

48. A computer program product according to claim 35, wherein the apparatus further comprises:
   an output displaying in a single view the characterization of the extent of delay for a plurality of airports.

49. A computer program product according to claim 48, wherein the single view is a graphical view showing the plurality of airports on a map.

50. A computer program product according to claim 49, wherein the apparatus further comprises means to make the graphical view available via a downloadable web page.

51. A computer program product according to claim 50, wherein the apparatus further comprises means to make details of the extent of delay available via the downloadable web page.

52. A computer program product according to claim 51, wherein the details of the extent of delay includes a list of flights delayed.

53. A computer program product according to claim 52, wherein the list of flights delayed includes for each delayed flight at least one of a characterization of the extent of its delay, its flight number, its aircraft identifier, aircraft type, departure airport, actual departure time, scheduled departure time, estimated departure time, destination airport, estimated time of arrival, other flight information pertinent thereto, including arrival or departure gate, and identification of a next segment, if any, to be followed by aircraft for each delayed flight, where a characterization of its delay, its destination airport and estimated time of arrival, and other pertinent information are provided.

54. A computer program product according to claim 51, wherein the apparatus further comprises means for providing a suitable hyperlink on the web page to access the details of the extent of delay.

55. A computer program product according to claim 35, the apparatus further comprises means for making available to a user at least one of:
(i) a list of any flights deemed delayed according to a set of criteria; and
(ii) for at least one flight deemed delayed, at least one of
  (a) a characterization of the extent of its delay;
  (b) flight number; aircraft identifier; aircraft type;
  (c) departure airport; actual departure time, scheduled departure time, estimated departure time;
  (d) destination airport; estimated time of arrival;
  (e) arrival or departure gate; and
  (f) identification of a next segment, if any, to be followed by aircraft for the at least one of flights deemed delayed.

56. A computer program product according to claim 55, wherein the extent of delay is determined, at least in part, on the basis of flights that have actually departed.

57. A computer program product according to claim 55, wherein the extent of delay is determined, at least in part, on the basis of delay estimated for flights that have not yet departed.

58. A computer program product according to claim 55, wherein the extent of delay is determined, at least in part, on the basis of flights that have actually arrived.

59. A computer program product to claim 55, wherein the extent of delay is determined, at least in part, on the basis of delay estimated for flights that have not yet arrived.

60. A method according to claim 55, wherein the apparatus further comprises means for providing a suitable hyperlink on a web page to access the information so as to make the information available to a user.

61. A computer program product for use on a computer system for characterizing traffic behavior of an airline, the computer program product comprising a computer usable medium having computer readable program code thereon, which, when loaded into the computer system, establishes an apparatus comprising:
  inputs to the computer system specifying scheduled flight information for the airline and real-time flight information for the airline, wherein flight delay information based on the scheduled flight information and real-time flight information is determined over a selected interval and is used to characterize an extent of delay for the airline; and
  an output from the computer system responsive to the input.

62. A computer program product according to claim 61, wherein the processes are performed with respect to a set of selected airports serviced by the airline.

63. A computer program product according to claim 61, wherein scheduled flight information includes departure information and arrival information.

64. A computer program product according to claim 61, wherein the apparatus further comprises means for determining flight delay information includes determining average delay by averaging the difference between scheduled flight information and real-time flight information by time of day over a selected number of days.

65. A computer program product according to claim 61, wherein the apparatus further includes means for making available for display on a map a characterization of the extent of delay.

66. A computer program product according to claim 61, wherein the apparatus further includes means for making the map available via a downloadable web page.

67. A computer program product according to claim 66, wherein the apparatus further includes means for making the scheduled flight information, the real-time flight information, and the flight delay information available via a downloadable web page.

* * * * *

UNITED STATES PATENT AND TRADEMARK OFFICE
CERTIFICATE OF CORRECTION

| | | |
|---|---|---|
| PATENT NO. | : 7,120,537 B2 | Page 1 of 1 |
| APPLICATION NO. | : 10/976195 | |
| DATED | : October 10, 2006 | |
| INVENTOR(S) | : Lorraine Flynn et al. | |

It is certified that error appears in the above-identified patent and that said Letters Patent is hereby corrected as shown below:

Col. 8, line 59
add --(i)-- before "a".

Signed and Sealed this

Twenty-seventh Day of February, 2007

JON W. DUDAS
*Director of the United States Patent and Trademark Office*